March 4, 1941. W. E. BURNHAM 2,234,073
PROPELLER
Filed Dec. 15, 1937
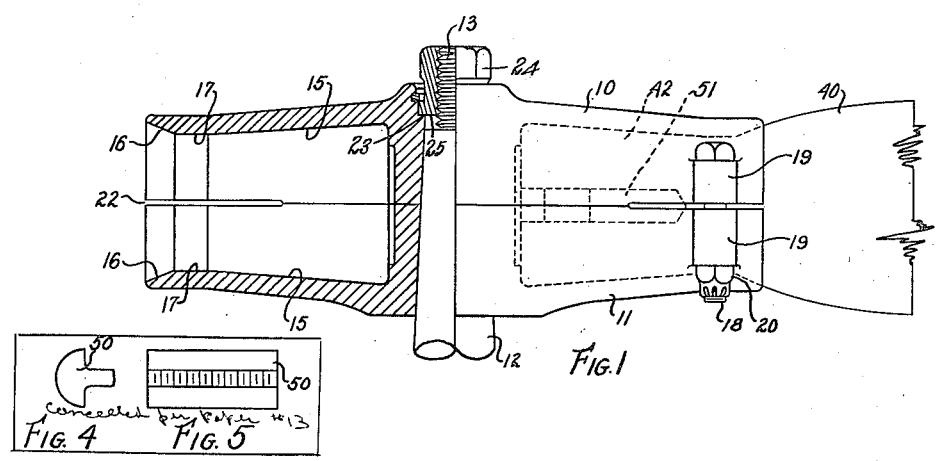
FIG. 1
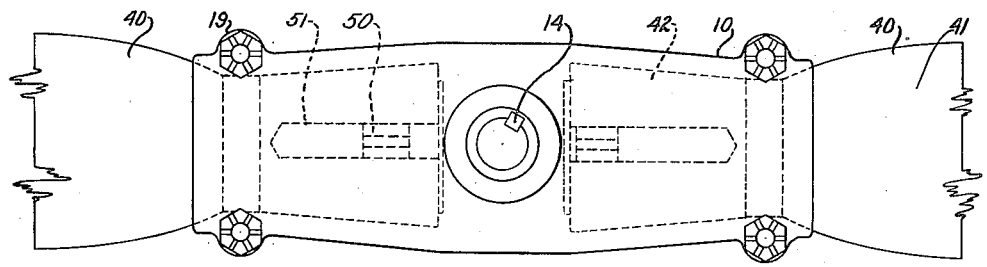
FIG. 4   FIG. 5
FIG. 2
INVENTOR.
Walter E. Burnham
BY Frank Gugelter
ATTORNEY.

Patented Mar. 4, 1941

2,234,073

UNITED STATES PATENT OFFICE 2,234,073

PROPELLER

Walter E. Burnham, Detroit, Mich., assignor to Freedman-Burnham Engineering Corporation, Cincinnati, Ohio, a corporation of Ohio Application December 15, 1937, Serial No. 179,966

2 Claims. (Cl. 170—173)

This invention relates to aeronautical propellers, and more particularly to aeronautical propellers having split hubs in combination with propeller blades which are adjustable as to pitch.

An object of the invention is to provide a split hub of simple design into which a propeller shaft butt may be quickly and easily positioned.

A further object of the invention is to provide a split hub and blade assembly which will permit adjustment of propeller pitch, provide a simple and effectve method for balancing a propeller blade and which will permit easy disassemblage and re-assemblage.

Still a further object of the invention is to provide a propeller assemblage comprising a split hub and a plurality of propeller blades, each of which may be separately adjusted as to pitch and balance, independently of the others.

A further object of the invention is to provide a propeller assemblage, the various parts of which may be easily and quickly replaced by an aeronautical mechanic.

A further object of the invention is to teach a method of producing a propeller blade designed as a "fixed blade" but which may be adjusted for maximum efficiency on any given aircraft, whereby the initial cost of such blades is materially reduced.

These and other objects of the invention are attained by the means hereinafter described and disclosed in the accompanying drawing, in which:

Fig. 1 is a side view showing a split hub and blade assembly comprising the invention having parts broken away to more clearly reveal the construction thereof.

Fig. 2 is a top view of the invention shown in Fig. 1.

It is to produce a split propeller hub of simple design, devoid of adjustable sleeves or collars, but which nevertheless will securely retain a wooden propeller blade in proper alignment, that this invention is primarily directed.

With the unprecedented popularity of the inexpensive privately owned aircraft now sweeping the country, the problem of providing a cheap, durable, adjustable propeller blade has become acute. Such privately owner planes, for the most part, come equipped with wooden propellers, which though quite satisfactory for a time, often become warped or broken and are otherwise rendered useless in a short time.

The present day replacement propeller blades have been expensive, first, from the standpoint of manufacture, since each plane has hitherto required a specially balanced blade of definite pitch, and, secondly, because of the time required to replace and adjust such a propeller blade, once installed.

These objects have been eliminated by means of the assemblage hereinafter disclosed.

As shown in Fig. 1 a split hub comprising complementary sections 10 and 11 is radially mounted upon tapered drive shaft 12.

Said drive shaft terminates at its outer end as a threaded bolt 13. Relative rotation between shaft 12 and the hub sections 10 and 11 is effectively prevented by means of key 14 which fits in suitably aligned keyways disposed in the shaft and hub members, and because of the snug tapered fit between the drive shaft and tapered hub bore.

The complementary hub sections comprise radial propeller blade butt engaging sockets. Each socket is provided with a major taper 15 and a minor taper 16. It should be noted that said major and minor tapers do not bisect, but are separated by a horizontal surface 17 which is disposed at right angles to the center line of drive shaft 12.

The major taper 15 is such that when a propeller blade butt having a complementary taper thereto is properly mounted within said hub socket, the centrifugal force produced by the rotating propeller blades will cause said blade butts to be more firmly gripped within said tapered socket. Said major taper slants or converges outwardly whereby the bottom of the socket has a greater diameter than the neck of said socket adjacent horizontal surface 17.

The minor taper 16 slants or diverges outwardly from the horizontal surface 17 whereby a shoulder is presented against which the shank of a propeller blade seats whereby said propeller blade will assume proper diametric relationship relative to drive shaft 12.

The horizontal surface 17 comprises, in an assembled socket, an annular plane or surface directly under the clamping means carried on either hub section. In this manner undue strains are prevented when said socket parts are clamped together around a propeller blade butt, which has a complementary contour to that presented by the interior of a socket. Such a horizontal annular band also alleviates the tendency for a propeller blade to be urged inward or outward within a socket as would be the case if the clamping force were to be exerted unequally upon a tapered propeller blade butt.

The two hub sections 10 and 11 are secured together by means of a plurality of bolts 18 which pass through and fit into the openings provided therefor in the integrally formed outwardly extending shoulder or lug portions 19 on the complementary sections 10 and 11 which comprise the hub. The bolts 18 are provided with castellated nuts 20 which are secured against movement therein by cotter pins 21.

As clearly shown in Fig. 1, a clearance 22 is provided between the outer ends of complementary hub sections 10 and 11. This is to assure that a propeller blade butt carried in such hub will be firmly held in place, and so that the horizontal surface 17 of the hub sections will bear tightly against the corresponding horizontal surface of a propeller blade butt.

Said hub sections may be formed of any suitable metal such as commonly used by the art. However, it should be noted that very satisfactory hub sections may be produced by casting from certain of the various aluminum alloys now on the market, whereby the usual cost of machining, reaming, etc., is eliminated or greatly reduced.

The outer section 10 of the hub assemblage differs from the inner section 11 in that the outer section has an abutment 23 provided against which the lower edge 25 of hub retaining nut 24 seats whereby the hub sections are properly positioned upon drive shaft 12.

In order to facilitate ease of handling and production and to reduce the cost of a propeller assemblage as a whole, a plurality of propeller blades are required, each forming one unit of the completed propeller.

As shown in Figs. 1 and 2 a propeller blade 40, comprising a blade section 41 and butt 42 is mounted between the two complementary hub sections 10 and 11. Said propeller butt is shaped so as to exactly fit the contour presented by the inner side of the hub sections, viz: the propeller butt has a major and a minor angle and plane surface which are in complementary conformity with the major and minor angles and horizontal surface of the hub sections. By means of minor angle 16 and horizontal surfaces 17, the propeller shaft is positively located a fixed distance from the center line of drive shaft 12. In this way it is possible for propeller blades to be manufactured in great quantities with the assurance that the radius described by each blade will equal that of the companion blade which comprises the complete propeller.

After a pair of blades have been properly adjusted for balance and weight, they are secured in place by the squeezing force exerted by bolts 19 onto hub sections 10 and 11.

The hub assembly is then fitted upon drive shaft 12 and nut 24 is drawn down tight.

After the propeller blades have been properly inserted within the hub assembly, the pitch should be checked for each blade. If a blade needs adjustment, it is done by loosing nut 24 and nut 20 of the socket of whichever propeller blade needs the adjustment. Such adjustment is accomplished by turning the blades relative to the hub.

By reason of the assembly herein described and set forth, it is possible to manufacture blades on a mass production basis, each blade being designed to have a definite R. P. M. for a known predetermined pitch. Blades so designed are made as fixed blades and may be installed and adjusted for maximum efficiency on the craft to which it is attached. In this manner the initial cost of propeller equipment is reduced.

Use of such blades and associated sectional hubs also reduces the upkeep charges, since if such a blade should become warped, its usefulness is not at an end since it may be adjusted whereby the warp may be neutralized by turning the blade within the hub so as to alter the pitch.

Blades so made may be stocked at airports since the "made to order" element of aeronautical propellers is almost entirely eliminated, being prevalent only in that the new blade have a proper length and size butt to fit the hub, the other characteristics of the propeller being accomplished by the hereinbefore mentioned adjustments.

An assembly made according to the teachings of this invention comprises a minimum of parts which might get out of order and require attention and adjustment, and permits the use of a propeller blade, the butt end of which is free of abrupt changes in angles and contour.

It should be noted that the greater the centrifugal force tending to pull the blades from the hubs becomes, the greater is the tendency for the hub to grip the butt of the blade whereby a change of pitch or possibility for the butt to pull out of the hub is made remote.

What is claimed is:

1. An aeronautical propeller and hub assembly comprising in combination a pair of complementary hub sections having a tapered bore extending therethrough for receiving a drive shaft, radially disposed propeller sockets formed by said hub sections, each adapted to receive a propeller blade butt, the interior of each socket comprising a pair of opposed truncated cones separated from one another by a narrow annular horizontal surface, the diameter of each cone progressively increasing from said horizontal surface whereby a long propeller butt engaging major taper is provided interiorly of the socket and terminating adjacent said drive shaft, and a shorter opposed propeller shank positioning minor taper provided interiorly of the socket remote from said drive shaft, said major taper functioning to grip the major portion of the butt of a propeller blade having a complementary taper to that of the hub socket, whereby the tendency of a blade to pull out from said hub socket due to centrifugal force is overcome, the shorter minor taper functioning to space the propeller blade a fixed distance from the center line of the drive shaft whereby opposed propeller blades will bear proper diametric relationship to one another, and suitable clamping means disposed externally of said socket in vertical alignment with said narrow horizontal surface intermediate said major and minor tapers whereby a propeller butt is accurately positioned and secured relative to said major and minor tapers.

2. An aeronautical propeller and hub assembly comprising in combination a pair of complementary hub sections adapted to form radially disposed propeller shank receiving sockets, the interior of each socket being a complement to its propeller shank, each socket comprising an open and a closed end and side walls, said side walls having oppositely tapered faces separated by an annular surface in parallelism with the longitudinal axis of said socket, a major taper provided interjacent said annular surface and the closed end of said socket, the slope of said major taper uniformly and progressively increasing from said annular surface, a minor taper provided intermediate the open end of said socket and said annular surface, the length of said major taper measured along the longitudinal axis of said socket exceeding the combined lengths of said annular surface and minor taper measured along said longitudinal axis, clamping means disposed externally of each socket in vertical alignment with said annular surface for precluding longitudinal shifting of said propeller shank within said socket by reason of clamping said hub sections tightly upon said shank, said major taper adapted to evenly distribute centrifugal load forces over a major portion of said shank whereby the effect of the shearing stresses set up in said shank are minimized.

WALTER E. BURNHAM.

CERTIFICATE OF CORRECTION.

Patent No. 2,234,073.  March 4, 1941.

WALTER E. BURNHAM.

It is hereby certified that error appears in the above numbered patent requiring correction as follows: In the drawing, strike out the boxed-in portion including Figures 4 and 5, and the notation "cancelled per paper #13"; and that the said Letters Patent should be read with this correction therein that the same may conform to the record of the case in the Patent Office.

Signed and sealed this 3rd day of June, A. D. 1941.

(Seal)

Henry Van Arsdale,
Acting Commissioner of Patents.